United States Patent [19]

Nakano et al.

[11] Patent Number: 5,166,229
[45] Date of Patent: Nov. 24, 1992

[54] EPOXY RESIN GEL COMPOSITION USEFUL AS AN ADHESIVE

[75] Inventors: Takahiro Nakano, Ashiya; Toshimori Sakakibara, Yasu, both of Japan

[73] Assignee: Sunstar Giken Kubushiki Kaisha, Osaka, Japan

[21] Appl. No.: 434,711

[22] Filed: Nov. 13, 1989

[30] Foreign Application Priority Data

Nov. 14, 1988 [JP] Japan .................................. 63-288621

[51] Int. Cl.$^5$ ................................................ H01B 1/06
[52] U.S. Cl. ...................................... 523/447; 523/455;
523/457; 523/458; 523/461; 523/465; 523/468;
252/511; 252/512; 252/513; 252/518; 252/519
[58] Field of Search ............... 523/465, 447, 455, 457,
523/458, 461, 468; 252/511, 512, 513, 518, 519

[56] References Cited

U.S. PATENT DOCUMENTS

| | | | |
|---|---|---|---|
| 3,882,064 | 5/1975 | Pregmon | 525/524 |
| 4,310,644 | 1/1982 | Miley | 528/112 |
| 4,342,674 | 8/1982 | Morgan | 523/465 |
| 4,451,591 | 5/1984 | Kozak et al. | 523/465 |
| 4,614,674 | 9/1986 | Lauterbach | 523/465 |
| 4,711,523 | 12/1987 | Iri et al. | 350/96.23 |
| 4,874,548 | 10/1989 | Hajovsky | 523/468 |

*Primary Examiner*—John C. Bleutge
*Assistant Examiner*—Frederick Krass
*Attorney, Agent, or Firm*—Wegner, Cantor, Mueller & Player

[57] ABSTRACT

Epoxy resin composition containing an epoxy resin and an organic gelling agent selected from a polyamide wax, a castor oil wax, a sorbitol derivative and an amino acid derivative, which is in the gel form and is optionally further incorporated with a latent curing agent and an electrically conductive material. Said epoxy resin composition has excellent adhesion strength even under heating and excellent shower resistance and wiping properties and is useful as an adhesive, particularly as a structural adhesive in an assembly line of automobiles.

5 Claims, No Drawings

EPOXY RESIN GEL COMPOSITION USEFUL AS AN ADHESIVE

This invention relates to an epoxy resin composition, more particularly to an epoxy resin gel composition comprising an epoxy resin and an organic gelling agent which is useful as an adhesive, particularly as a structural adhesive for automobiles. The composition is prepared by dissolving with heating a specific organic gelling agent in an epoxy resin to swell and gelate the mixture, which is a thermosetting composition capable of being cured at 80° to 220° C. and has a high viscosity.

PRIOR ART

Epoxy resins have been widely used as an adhesive or paint composition because of their excellent adhesion to various materials with excellent mechanical properties, electrical properties and chemical resistance.

There is used a one-pack thermosetting epoxy resin adhesive comprising an epoxy resin and a latent curing agent as a structural adhesive in an assembly line of automobiles. However, this composition is pasty and is disadvantageously washed off with washing shower water in the electrodeposition step following to the adhesive coating step. Moreover, the adhesive composition is usually applied to in an excess amount in order to ensure corrosion prevention and sufficient adhesion, but this causes disadvantageous squeeze-out of the adhesive in the pressing step which is hardly wiped off.

It has been proposed to add a plasticizing component having a high viscosity to the epoxy resin adhesive composition in order to increase the viscosity of the composition and thereby to improve the shower resistance and to avoid the troublesome wiping off of the adhesive squeezed out. However, the addition of the plasticizing component results disadvantageously in lowering of the adhesion strength, particularly lowering of adhesion strength under heating due to the lowering of the glass transition point (Tg) of the cured product.

BRIEF DESCRIPTION OF THE INVENTION

The present inventors have intensively studied as to improvement of the conventional epoxy resin composition so as to eliminate the above-mentioned defects thereof, and have found that when a specific organic gelling agent is incorporated into the epoxy resin composition, the composition has an appropriately increased viscosity and thereby can exhibit excellent shower resistance and wiping properties without lowering of the adhesion strength (even under heating).

An object of the invention is to provide an improved epoxy resin composition suitable as a structural adhesive for automobiles. Another object of the invention is to provide an epoxy resin gel composition which has excellent adhesion strength, excellent washing resistance and wiping properties and is suitable as a structural adhesive useful in an assembly line of automobiles. These and other objects and advantages of the invention will be apparent from the following description.

DETAILED DESCRIPTION OF THE INVENTION

The epoxy resin gel composition of the invention comprises an epoxy resin and an organic gelling agent selected from the group consisting of a polyamide wax, a castor oil wax, a sorbitol derivative and an amino acid derivative, which is prepared by dissolving at least one of the organic gelling agents in an epoxy resin with heating and then cooling the mixture to give a gel composition.

The epoxy resin used in this invention includes conventional glycidyl ether type epoxy resins and urethane-modified glycidyl ether type epoxy resins, for example, epoxy resins prepared from a reaction product of a polyhydric phenol and epichlorohydrin [e.g. diglycidyl ether of 2,2-bis(4-hydroxyphenyl)propane (hereinafter, referred to "bisphenol A")], a reaction product of a polyhydric phenol alkylene oxide adduct and epichlorohydrin (e.g. diglycidyl ether of bisphenol A ethylene oxide adduct and optionally of bisphenol A propylene oxide adduct), a reaction product of an aliphatic polyhydric alcohol and epichlorohydrin (e.g. glycerin triglydicyl ether, 1,6-hexanediol diglycidyl ether), a hydrogenated reaction product of a polyhydric phenol or its alkylene oxide adduct and epichlorohyrin (e.g. polyglycidyl ether of hydrogenated bisphenol A), and further urethane-modified epoxy resins, that is, products prepared by modifying the above epoxy resins with a urethane prepolymer having a terminal NCO group or by reacting a urethane prepolymer having a terminal NCO group with a compound having an epoxy group and a hydroxyl group (e.g. glycidol, glycidyl ether of a polyhydric alcohol, etc.), among which the epoxy resins prepared from polyhydric phenol derivatives such as diglycidyl ether of bisphenol A and diglycidyl ether of urethane-modified bisphenol A are particularly preferable. The epoxy resins have preferably an epoxy equivalent of not more than 500 and are preferably liquid at room temperature.

The organic gelling agent to be added to the epoxy resin includes polyamide waxes, castor oil waxes, sorbitol derivatives and amino acid derivatives. The gelling agent is usually used in an amount of 3 to 30 parts by weight, preferably 5 to 20 parts by weight, per 100 parts by weight of the epoxy resin. When the gelling agent is used in an amount of less than 3 parts by weight, the desired effect for gelling the composition can not be achieved, and on the other hand, when the amount is over 30 parts by weight, the composition shows disadvantageously significant lowering of adhesion strength under heating due to the lowering of Tg of the cured product.

The polyamide waxes include, for example, reaction products of a fatty acid (e.g. stearic acid, ricinoleic acid, oleic acid, hydroxystearic acid, erucic acid, lauric acid, ethylenebis(stearic acid), ethylenebis(oleic acid), other fatty acids) and a polyamine (e.g. ethylenediamine, diethylenetriamine, triethylenetetramine, polyethylenepolyamine, etc.), and include commercially available Disparone 6500 and Disparone 6900-20X (manufactured by Kusumoto Kasei K.K., Japan).

The sorbitol derivatives include, for example, dibenzylidene-sorbitol, tribenzylidene-sorbitol, and their nucleus-substituted derivatives. These dibenzylidene-sorbitol and tribenzylidene-sorbitol can be prepared by condensation reaction of sorbitol and benzaldehyde. The nucleus-substituted derivatives means derivatives of the dibenzylidene-sorbitol and tribenzylidene-sorbitol having one or more substituents selected from the group consisting of an alkyl group having 1 to 12 carbon atoms (e.g. methyl, ethyl, propyl, isopropyl, butyl, isobutyl, octyl, etc.) and an alkoxy group having 1 to 6 carbon atoms (e.g. methoxy, ethoxy, propoxy, butoxy, etc.) on the phenyl ring.

The amino acid derivatives include, for example, N-lauroyl-L-glutamic acid-α,γ-di-n-butyramide (commercially available product: oil-gelling agent GP-1 manufactured by Ajinomoto Co., Inc., Japan).

The epoxy resin composition of this invention can be prepared by adding a prescribed amount of the organic gelling agent to the above epoxy resin, heating the mixture at 90° to 160° C. to dissolve (or disperse) the gelling agent in the epoxy resin, and allowing to cool at room temperature (spontaneous cooling) to give a gel composition. The composition has preferably a viscosity of not less than 500 poises at a material temperature of 40° C. at 20 sec$^{-1}$ (measured with SOD viscometer).

The epoxy resin gel composition thus prepared is incorporated with a conventional latent curing agent (e.g. dicyandiamide, 4,4'-diaminodiphenylsulfone, imidazole, 2-n-heptanedecylimidazole, isophthalic dihydrazide, N,N'-dialkylurea derivatives such as 3-phenyl-1,1-dimethylurea, N,N'-dialkylthiourea derivatives such as diethylthiourea, melamine derivatives such as 2,4-diamino-6-[2'-methylimidazolyl-(1')]ethyl-s-triazine, etc.) to give a one-pack thermosetting composition which is useful as an adhesive or a paint composition in various fields. The latent curing agent is usually incorporated in an amount of 1 to 30 parts by weight to 100 parts by weight of the composition. For the purpose of using the epoxy resin gel composition as a structural adhesive for automobiles, the composition may also be incorporated with a conventional electrically conductive material (e.g. metal oxide-iron oxide sintered composite ferrite or α-$Fe_2O_3$ particles, metal particles, metal oxide particles, carbon powder, graphite powder, etc.), by which the composition can be used in spot welding in the assembly line of automobiles. The electrically conductive material is usually incorporated in an amount of 1 to 40 parts by weight to 100 parts by weight of the composition.

The epoxy resin composition of this invention having the above components is in the gel state and has a high viscosity, and hence can exhibit satisfactory shower resistance and wiping properties when applied to the assembly line of automobiles as a structural adhesive.

This invention is illustrated by the following Examples and Reference Examples but should not be construed to be limited thereto.

EXAMPLE 1

To bisphenol A type epoxy resin (EP4100, manufactured by Asahi Denka K.K., Japan) (90 parts by weight) is added a polyamide wax (Disparone 6500, manufactured by Kusumoto Kasei K.K., Japan) (10 parts by weight), and the mixture is heated at 100° C. to dissolve or disperse the polyamide wax in the epoxy resin, and the mixture is spontaneously cooled for 24 hours till room temperature to give an epoxy resin gel composition.

EXAMPLE 2

To the same epoxy resin as used in Example 1 (90 parts by weight) is added benzylidene-sorbitol (Gel Master-D, manufactured by Shinnippon Rika K.K., Japan) (10 parts by weight), and the mixture is heated at 150° C. to dissolve or disperse the benzylidene-sorbitol in the epoxy resin, and the mixture is spontaneously cooled for 24 hours till room temperature to give an epoxy resin gel composition.

EXAMPLE 3

To a urethane-modified bisphenol A type epoxy resin (EPU-6, manufactured by Asahi Denka K.K., Japan) (95 parts by weight) is added an amino acid derivative, N-lauroyl-L-glutamic acid-α,γ-di-n-butyramide (Oil-gelling agent GP-1, manufactured by Ajinomoto Co., Inc., Japan) 5 parts by weight), and the mixture is heated at 150° C. to dissolve or disperse the amino acid derivative in the epoxy resin, and the mixture is spontaneously cooled for 24 hours till room temperature to give an epoxy resin gel composition.

Preparation of adhesives and test of the properties

The epoxy resin compositions prepared in Examples 1 to 3 are each incorporated with the components as shown in Table 1 to give one-pack thermosetting adhesives. The shear strength, shower resistance and wiping properties of these adhesives were tested. The results are shown in Table 1.

Reference Examples 1 and 2

For comparison purpose, the same epoxy resin as used in Example 1 was used instead of the gelated composition (Reference Example 1), and a synthetic rubber was added to the epoxy resin to prepare a composition (Reference Example 2). By using these compositions, one-pack adhesives were prepared in the same manner as above and subjected to the tests likewise. The results are also shown in Table 1.

TABLE 1

| Components | Examples | | | Ref. Examples | |
|---|---|---|---|---|---|
| | 1 | 2 | 3 | 1 | 2 |
| Gelated epoxy resin | 100 | 100 | 100 | — | — |
| Non-gelated resin | — | — | — | 100 | 100 |
| Dicyandiamide | 8 | 8 | 8 | 8 | 6.4 |
| Imidazole | 2 | 2 | 2 | 2 | 1.6 |
| Silica | 5 | 5 | 5 | 5 | 5 |
| NBR rubber | — | — | — | — | 20 |
| Shear strength *1 20° C. (kg/cm$^2$) | 290 | 290 | 290 | 290 | 220 |
| 80° C. | 220 | 220 | 220 | 220 | 130 |
| Shower resistance *2 | ○ | ○ | ○ | x | ○ |
| Wiping properties *3 | ○ | ○ | ○ | x | △ |

*1 It was measured in the following conditions and manner.
Material to be adhered: SPCC-SD steel panel, size: 1.6 × 25 × 100 mm, lap: 12.5 × 25 mm
Curing condition: 180° C. × 20 minutes
Thickness of adhesive: 0.15 mm
Measurement conditions: measured at a tensile speed of 5 mm/min. in atmosphere of 20° C. or 80° C. for one hour.
*2 It was measured in the following manner.
The adhesive was applied to a steel panel having an oily surface in an amount of 3 mmφ to prepare a test piece (TP). The thus prepared TP was fixed at an angle of 45° to a shower nozzle and showered with water of 40° C. under water pressure of 4 kg · f/cm$^2$ at a distance between the nozzle and TP of 70 cm for one minute, and the state of scattering of the adhesive was observed and was evaluated as follows.
○: The adhesive was retained almost in the original state
x: The adhesive was scattered off.
*3 It was measured in the following manner.
The adhesive was applied to a steel panel having an oily surface in an amount of 3 mmφ and then the adhesive was wiped off with a rubbery spatula, and the wiped state was observed and was evaluated as follows.
○: The adhesive was clearly wiped off.
△: The adhesive was almost wiped off but still remained in a filmy state.
x: Much adhesive remained without being wiped off.

What is claimed:
1. An epoxy resin gel composition comprising:
   a gel composition prepared by adding 3 to 30 parts by weight of an organic gelling agent to 100 parts by weight of an epoxy resin, heating the mixture to dissolve or disperse the organic gelling agent in the epoxy resin and cooling;

said organic gelling agent being a member selected from the group consisting of (i) a reaction product of a fatty acid selected from the group consisting of stearic acid, ricinoleic acid, oleic acid, hydroxystearic acid, erucic acid, lauric acid, ethylenebis(stearic acid) and ethylenebis(oleic acid) and a polyamine selected from the group consisting of ethylenediamine, diethylenetriamine, triethylenetetramine and polyethylenepolyamine, (ii) a castor oil wax, (iii) a sorbitol derivative selected from the group consisting of dibenzylidene-sorbitol and tribenzylidene-sorbitol which optionally have a substituent selected from the group consisting of an alkyl group having 1 to 12 carbon atoms and an alkoxy group having 1 to 6 carbon atoms on the phenyl ring and (iv) N-lauroyl-L-glutamic acid-$\alpha,\gamma$-di-n-butyramide; in admixture with a latent curing agent selected from the group consisting of dicyandiamide, 4,4'-diaminodiphenylsulfone, imidazole, 2-n-heptanedecylimidazole, isophthalic dihydrazide, and N,N'-dialkylurea derivative, an N,N'-dialkylthiourea derivative and a melamine derivative; and an electrically-conductive material selected from the group consisting of metal oxide-iron oxide sintered composite ferrite particles, $\alpha$-$Fe_2O_3$ particles, metal particles, metal oxide particles, carbon powder and graphite powder;

said latent curing agent being present in an amount of 1 to 30 parts by weight per 100 parts by weight of the composition, and said electrically-conductive material being present in an amount of 1 to 40 parts by weight per 100 parts by weight of the composition.

2. An epoxy resin gel composition according to claim 1, wherein the heating is at a temperature of 90°–160° C. and the cooling is at room temperature.

3. An epoxy resin gel composition according to claim 1, wherein said organic gelling agent is the reaction product of a fatty acid selected from the group consisting of stearic acid, ricinoleic acid, oleic acid, hydroxystearic acid, erucic acid, lauric acid, ethylenebis(stearic acid) and ethylenebis(oleic acid) and a polyamine selected from the group consisting of ehtylenediamine, diethylenetriamine, triethylenetetramine and polyethylenepolyamine.

4. An epoxy resin gel composition according to claim 1, wherein said organic gelling agent is a sorbitol derivative.

5. An epoxy resin gel composition comprising:

a gel composition prepared by adding 3 to 30 parts by weight of an organic gelling agent to 100 parts by weight of an epoxy resin, heating the mixture to dissolve or disperse the organic gelling agent in the epoxy resin and cooling;

said organic gelling agent being N-lauroyl-L-glutamic acid-$\alpha,\gamma$-di-n-butyramide;

a latent curing agent selected from the group consisting of dicyandiamide, 4,4'-diaminodiphenylsulfone, imidazole, 2-n-heptanedecylimidazole, isophthalic dihydrazide, and N,N'-dialkylurea derivative, an N,N'-dialkylthiourea derivative and a melamine derivative; and an electrically-conductive material selected from the group consisting of metal oxide-iron oxide sintered composite ferrite particles, $\alpha$-$Fe_2O_3$ particles, metal particles, metal oxide particles, carbon powder and graphite powder;

said latent curing agent being present in an amount of 1 to 30 parts by weight per 100 parts by weight of the composition, and said electrically-conductive material being present in an amount of 1 to 40 parts by weight per 100 parts by weight of the composition.

* * * * *